(12) United States Patent
Nakajima et al.

(10) Patent No.: US 6,987,881 B2
(45) Date of Patent: Jan. 17, 2006

(54) AUTOMATIC VISIBILITY IMPROVEMENT METHOD FOR DIGITAL IMAGE

(75) Inventors: Masato Nakajima, Kanagawa (JP); Kosei Takahashi, Kanagawa (JP)

(73) Assignees: Keio University, Tokyo (JP); Olympus Corporation, Tokyo (JP)

( * ) Notice: Subject to any disclaimer, the term of this patent is extended or adjusted under 35 U.S.C. 154(b) by 602 days.

(21) Appl. No.: 10/133,775

(22) Filed: Apr. 26, 2002

(65) Prior Publication Data
US 2003/0202693 A1    Oct. 30, 2003

(51) Int. Cl.
G06K 9/34    (2006.01)
G06K 9/46    (2006.01)

(52) U.S. Cl. ...................................... 382/173; 382/203

(58) Field of Classification Search ................ 382/164, 382/168, 170, 173, 181, 191, 203, 219, 254, 382/260, 264, 276, 277, 280; 358/451, 522, 358/523
See application file for complete search history.

(56) References Cited

U.S. PATENT DOCUMENTS

| | | | | |
|---|---|---|---|---|
| 3,993,976 A | * | 11/1976 | Ginsburg | 382/211 |
| 5,671,294 A | * | 9/1997 | Rogers et al. | 382/228 |
| 6,304,675 B1 | * | 10/2001 | Osbourn et al. | 382/225 |
| 6,309,353 B1 | * | 10/2001 | Cheng et al. | 600/437 |
| 6,415,046 B1 | * | 7/2002 | Kerut, Sr. | 382/128 |
| 6,512,846 B1 | * | 1/2003 | Luo | 382/165 |
| 6,584,233 B1 | * | 6/2003 | Kane et al. | 382/254 |
| 6,594,391 B1 | * | 7/2003 | Quadranti et al. | 382/203 |
| 6,728,400 B1 | * | 4/2004 | Matsugu | 382/164 |

FOREIGN PATENT DOCUMENTS

JP        10-261077        9/1998

OTHER PUBLICATIONS

Kobayashi, Naoki et al., "Fast Adaptive Contrast Enhancement Method for the Display of Gray-Tone Images", *Faculty of Science and Technology, Keio University, Yokohama-shi, 223, Japan*, vol. J77-D-II, No. 3, pps. 502-509 (Mar. 1994).

* cited by examiner

*Primary Examiner*—Andrew W. Johns
*Assistant Examiner*—Amir Alavi
(74) *Attorney, Agent, or Firm*—Straub & Pokotylo; John C. Pokotylo

(57)    ABSTRACT

An image dividing means 2 analyzes the texture of input image, and on the basis of result of analysis it fully automatically divides the input image into a plurality of division areas. A density conversion curve generating means 3 determines a clip value for each division area on the basis of the broadness of dynamic range for determining a density histogram smoothing degree and generates a cumulative density histogram by using the determined clip valve for clipping. A density converting means 4 executes a density conversion process specific to each pixel in each division area, and outputs the result to an image output side apparatus. Thus, it is possible to permits automatically reducing loss of data outputted from an electronic imaging device to a monitor, a printer, etc.

15 Claims, 13 Drawing Sheets

(a)

(b)

(c)

(d)

(a)        (b)

ENTROPY H

Hmin : MINIMUM ENTROPY VALUE IN ALL AREAS
Hmax : MAXIMUM ENTROPY VALUE IN ALL AREAS
Cmax : EXPERIMENTALLY DETERMINED VALUE (a)

(b)

(a)  (b)

| 1 | 1 | 1 |
|---|---|---|
| 0 | 0 | 0 |
| -1 | -1 | -1 |

(a)

| 1 | 0 | -1 |
|---|---|---|
| 1 | 0 | -1 |
| 1 | 0 | -1 |

(b)

| 1 | 1 | 0 |
|---|---|---|
| 1 | 0 | -1 |
| 0 | -1 | -1 |

(c)

| 0 | 1 | 1 |
|---|---|---|
| -1 | 0 | 1 |
| -1 | -1 | 0 |

(d)

(a)

(b)

(c)

(d)

(a)

(b)

AUTOMATIC VISIBILITY IMPROVEMENT METHOD FOR DIGITAL IMAGE

BACKGROUND OF THE INVENTION

The present invention relates to automatic visibility improvement method for digital image suited for electronic imaging devices such as video cameras and digital cameras.

When an image of a scene having very dark and very bright parts (see FIG. 8(a) or FIG. 12(a)) is picked up with an electronic imaging device such as a video camera or a digital camera and is displayed on a monitor or outputted to a printer, the very bright parts tend to be decolored while the very dark parts tend to be merged with back ground (see FIG. 8(b) or FIG. 12(b)). Consequently, there arises a phenomenon of failure of reproduction of detail data obtained with imaging element of electronic imaging device. This phenomenon stems from the fact that the image output apparatus such as monitor or printer has a narrower dynamic range than that of the image inputted to the image output apparatus.

Various methods have heretofore been proposed to reduce the above data loss. For example, Japanese Patent No. 2951909 discloses a system for and a method of gradation correction for imaging devices, in which an input image is divided into a plurality of blocks of a square grating, the average brightness of the blocks is then computed, and gradation correction is made for each division area on the basis of the computed average brightness.

However, according to the above Japanese Patent No. 2951909, since the input image is divided into a plurality of division areas on the basis of the average brightness of the blocks, a problem arises, for example, where a texture A as shown in FIG. 9(a), in which the brightness varies stepwise in a narrow brightness range, and a texture B as shown in FIG. 9(b), in which the brightness varies stepwise in a broad brightness range, are adjacent areas. In this case, the two areas are regarded to be the same and are gradation corrected with the same gradation correction curve. Consequently, if the gradation correction curve is determined to be optimal for the texture A, the texture B is decolored in very bright parts and indistinguishable in very dark parts. If the curve is determined to be optimal for the texture B, on the other hand, the stepwise brightness variations of the texture A may not be reproduced.

In addition, although no detailed description of the gradation correction was made, if the method thereof is like those in prior arts, the gradation correction will be executed such that density values that frequently appear in the area tend to be highly emphasized in terms of contrast. This means that useful data maybe lost when their density values do not appear frequency.

SUMMARY OF THE INVENTION

The present invention was made in view of the above problems, and it has an object of providing an automatic visibility improvement method for digital image capable of reducing the loss of useful data compared to the prior art case by dividing the input image into a plurality of division areas on the basis of the texture analysis result and, preferably, determining a density histogram smoothing degree for each area on the basis of the broadness of the dynamic range.

According to a first aspect of the present invention, there is provided an automatic visibility improvement method for digital image comprising steps of dividing an input image into a plurality of division areas and executing a density conversion process specific to each division area, wherein: texture of the input image is analyzed, and the division areas are determined on the basis of the analysis result.

In a second aspect of the automatic visibility improvement method for digital image, the texture analysis in the first aspect is executed based on division of the input image into a plurality of division areas of different textures by a filtering process using an LOG filter for input image operation.

In a third aspect of the automatic visibility improvement method for digital image, the texture analysis in the first aspect is executed based on a process of analyzing frequency components of the input image, and includes a process of (1) dividing the input image into a plurality of small blocks like a square grating, (2) computing frequency component data of each small block by Fourier transform or Wavelet transform and (3) progressively unifying small blocks on the basis of similarity measure of frequency component data of adjacent small blocks.

In a fourth aspect of the automatic visibility improvement method for digital image, the texture analysis in the first aspect is executed based on a process of edge length judgment with respect to the input image, and includes a process of (1) dividing the input image to a plurality of small blocks like a square grating, (2) computing the sum of the edge lengths of the pixels in each small block, and (3) progressively unifying the small blocks on the basis of the similarity measure of the edge length sums of adjacent small blocks.

According to a fifth aspect of the present invention, there is provided an automatic visibility improvement method for digital image comprising steps of dividing an input image into a plurality of division areas and executing a density conversion process specific to each division area, wherein: an adaptive histogram smoothing method as contrast emphasizing process in image processing is adopted for the input image; and a reference division area in the adaptive density histogram smoothing method is fully automatically determined by using the division area determination method as set forth in one of the first to fourth aspects, while fully automatically determining a clip value in the local histogram smoothing method on the basis of the manner of fluctuations of the density histogram density value.

In a sixth aspect of the automatic visibility improvement method for digital image, in one of the first to fourth aspects as the density conversion process specific to each division area is executed for each division area a process of (1) generating a density histogram, (2) computing the manner of fluctuations of the density histogram density value, (3) determining a clip value influential on the degree of smoothing of the density histogram, (4) clipping the density histogram to the clip value, (5) generating a cumulative density histogram from the clipped density histogram and (6) executing density conversion of each pixel in the division area with the cumulative histogram used as density conversion curve.

In a seventh aspect of the automatic visibility improvement method for digital image, the manner of density value fluctuations of the density histogram and the clip value in the sixth aspect are in a monotonously reducing relation to each other such that the clip value is reduced with increasing density value fluctuations of the density histogram.

In an eighth aspect of the automatic visibility improvement method for digital image, the manner of density value fluctuations of the density histogram in the seventh aspect is evaluated in terms of the average appearance frequencies of densities of the pixels in each division area (i.e., entropy).

Specifically, in order to attain the above object of the present invention, the first aspect concerns an automatic visibility improvement method for digital image comprising the steps of dividing an input image into a plurality of division areas and executes a density conversion process specific to each division area, wherein the texture of the input image is analyzed, and the division areas are determined on the basis of the result of analysis.

In the automatic visibility improvement method for digital image of the first aspect, the texture of the input image is analyzed, the input image is divided into a plurality of division areas on the basis of the result of analysis, and a density conversion process specific to each division area is executed. The texture analysis may be made by the methods as set forth in the second to the fourth aspects, i.e., a method using an LOG filter for input image operation, a method based on a process of analyzing frequency components of the input image and a method based on a process of edge length judgment with respect to the input image.

The fifth aspect concerns an automatic visibility improvement method for digital image comprising the steps of dividing an input image into a plurality of division areas and executing a density conversion process specific to each division area, wherein an adaptive density histogram smoothing method well known as contrast emphasizing process in image processing is adopted for the input image, and a reference division area in the adaptive density histogram smoothing method is fully automatically determined by using the division area determination method as set forth in one of the first to fourth aspects, while automatically determining a clip value in the adaptive density histogram smoothing method according to the manner of fluctuations of the density histogram density value.

The sixth aspect concerns the automatic visibility improvement method for digital image, wherein in one of the first to fourth aspects as the density conversion process peculiar to each division area is executed for each division area a process of (1) generating a density histogram, (2) computing the manner of fluctuations of the density histogram density value, (3) determining a clip value influential on the degree of smoothing of the density histogram, (4) clipping the density histogram to the clip value, (5) generating a cumulative density histogram from the clipped density histogram and (6) executing density conversion of each pixel in the division area with the cumulative histogram used as density conversion curve.

The automatic visibility improvement method for digital image of the fifth aspect adopts an adaptive histogram equalization method (hereinafter abbreviated as AHE), which is well known as contrast emphasizing process in image processing. In the AHE, as shown in FIGS. 10(a) to 10(d), a reference area of an appropriate size is provided around a pixel under attention, the density histogram of this area is generated and clipped with an appropriate clip value to obtain a cumulative density histogram, which is normalized to be used as density conversion curve for density conversion of the pixel under attention. By the term "clip value" is meant a parameter for determining the degree of smoothing the density histogram. The density histogram smoothing degree is the higher the greater the clip value and the lower the lower the clip value.

In the automatic visibility improvement method for digital image in the fifth or sixth aspect, the above reference area in the AHE is fully automatically determined by the division area determination method as set forth on the basis of the first, second, third or fourth aspects. The clip value in the AHE is also fully automatically determined for each division area according to the manner of fluctuations of the density histogram density value. As the index of evaluation of the density histogram density value fluctuation manner, it is possible to use, in addition to the average appearance frequencies of densities of the pixels in each division area as clearly set forth in claim 8 (entropy), such indexes as the dispersion of the appearance frequencies of densities of the pixels in each division area and the edge length sum of the pixels in each division area. In the case of using any such parameter, the manner of density value fluctuations of the density histogram and the clip value are in a monotonously reducing relation to each other such that the clip value is reduced with increasing dynamic range of the density histogram.

Other objects and features will be clarified from the following description with reference to attached drawings.

PREFERRED EMBODIMENTS OF THE INVENTION

Preferred embodiments of the present invention will now be described with reference to the drawings.

Figure 1:
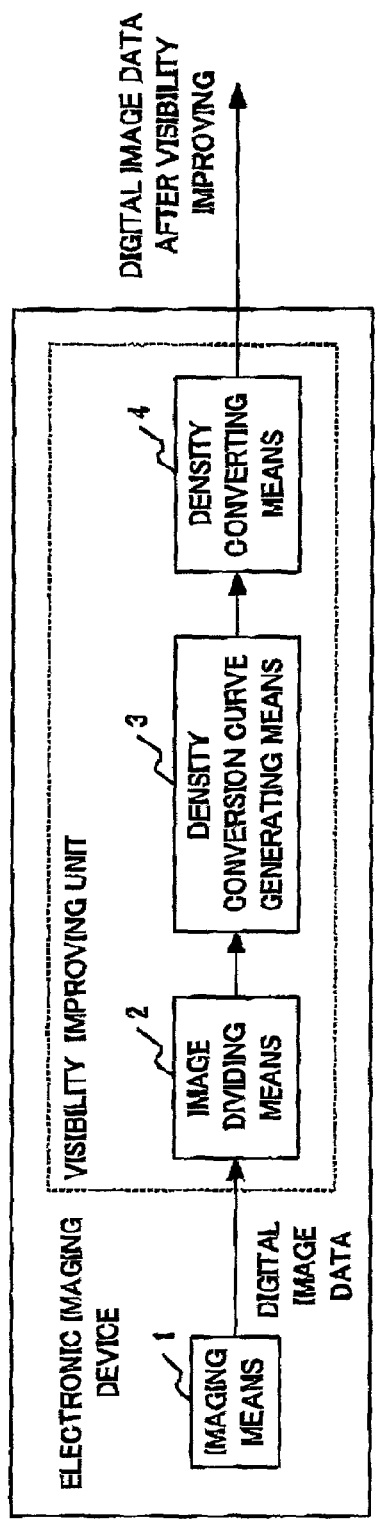
FIG. 1(a) is a block diagram showing the construction of an electronic imaging device pertaining to an embodiment.
FIG. 1(b) is a block diagram showing an image output system for outputting image after a visibility improvement process in the same electronic imaging device.
Figure 1:
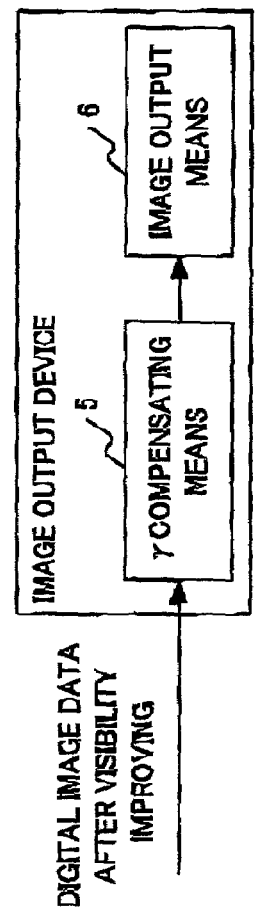
Figure 2:
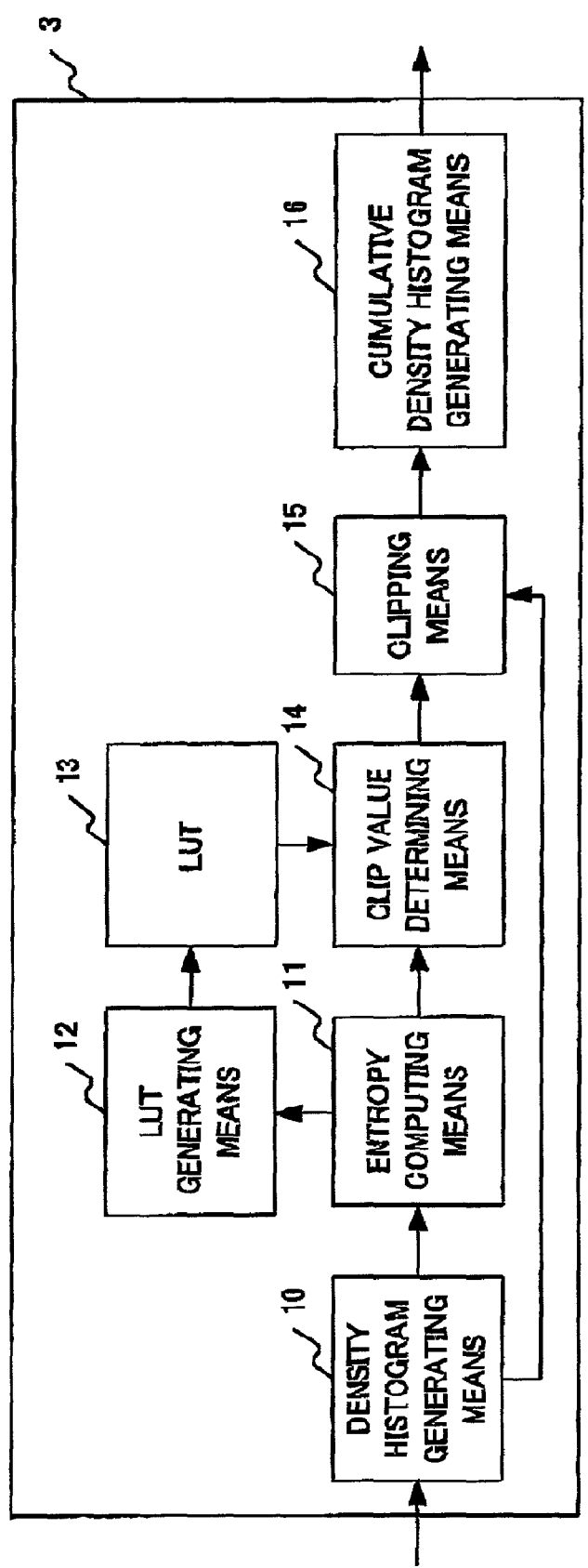
FIG. 2 is a block diagram showing the construction of a density conversion curve generating means.

Now, an embodiment of the electronic imaging device adopting the automatic visibility improvement method for digital image according to the present invention (hereinafter referred to as Embodiment 1) will be described. FIG. 1(a) is a block diagram showing the construction of Embodiment 1 of the electronic imaging device. This electronic imaging device comprises an imaging means 1, an image dividing means 2, a density conversion curve generating means 3 and a density converting means 4. The density conversion curve generating means 3, as shown in FIG. 2, includes a density histogram generating means 10, an entropy computing means 11, an LUT (look-up table) generating means 12, an LUT 13, a clip value determining means 14, a clipping means 15 and a cumulative density histogram generating means 16.

The visibility improvement process in the electronic imaging device having the above construction is executed as follows (see FIG. 3(a)).

1. Image Inputting

An image picked up by the imaging means 1 such as a CCD camera is inputted to the image dividing means 2 (step S1). The inputted image usually has very bright parts, very dark parts and bright/dark merged parts.

2. Image Dividing

Figure 4:
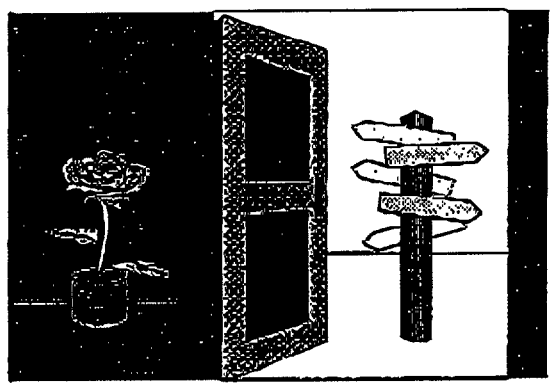
FIGS. 4(a) to 4(d) are views for describing a method of image division in an image dividing means.
Figure 4:
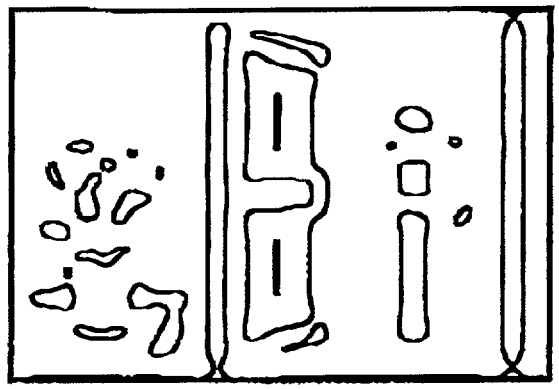
Figure 4:
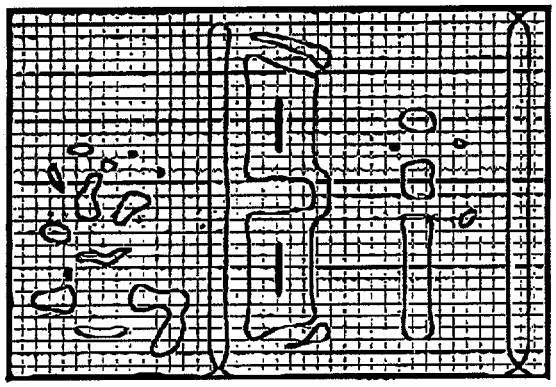
Figure 4:
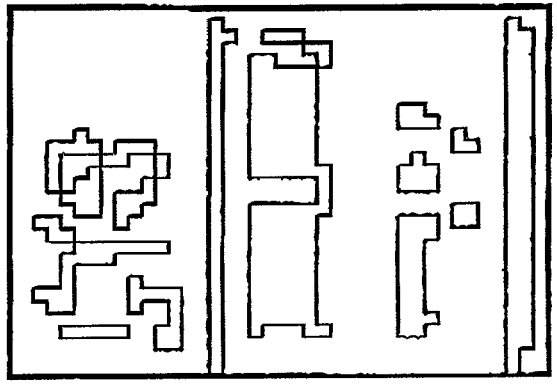
Figure 12:
FIGS. 12(a) to 12(d) are another example of FIG. 4.
Figure 12:
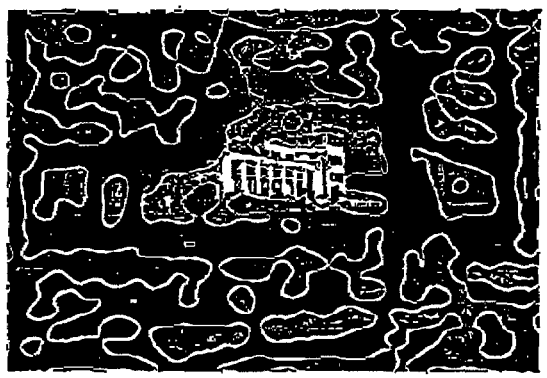
Figure 12:
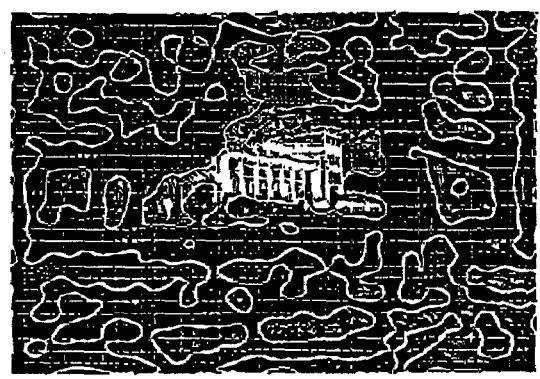
Figure 12:
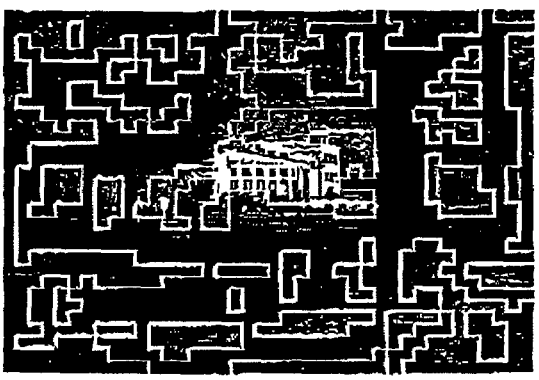
Figure 13:
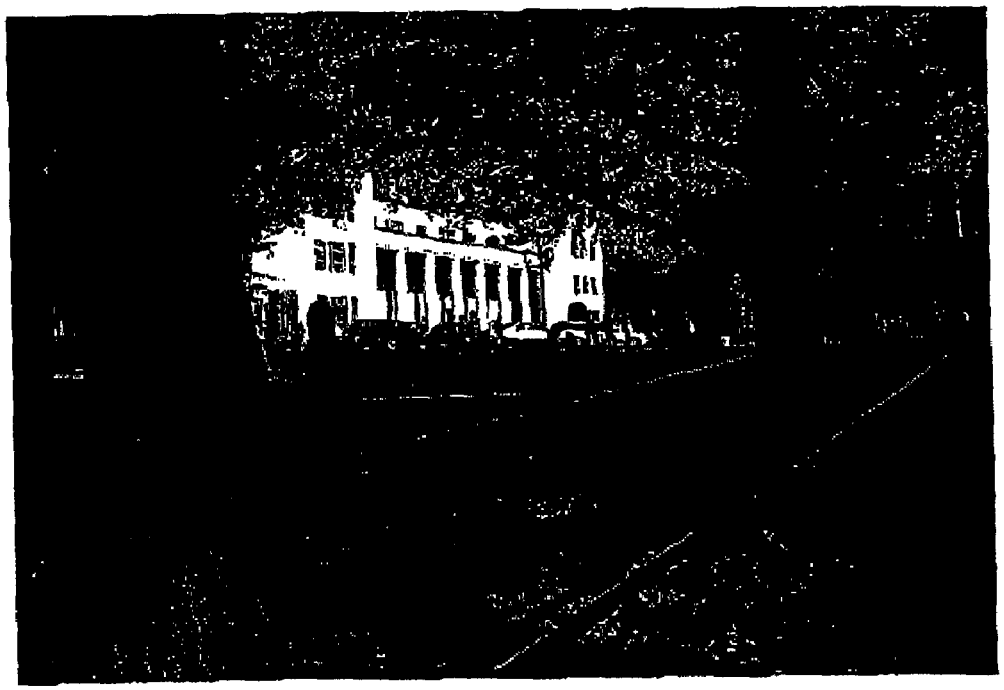
FIGS. 13(a) and 13(b) are another example of FIG. 8.
Figure 13:

The image dividing means 2 analyzes the texture of the input image, and divides the input image into a plurality of division areas on the basis of the analysis result (step S2). In this Embodiment 1, a filtering process using an LOG filter represented by Equation 1 for input image operation is executed for division area determination. FIG. 4(b) (or FIG. 12(b)) shows the divided result of the input image shown in FIG. 4(a) (or FIG. 12(a)) into a plurality of division areas. The result of image division using the texture analysis may often be different from the result of person's manual division of the same image by observation thereof. Therefore, if the texture analysis result is directly used, the different parts between the two image division results are felt unnatural by the person. Accordingly, in Embodiment 1 the result of dividing image by the texture analysis, acquired in unit of pixel, is quantized by slightly reducing the resolution of the image division (step S3). Specifically, the input image is divided into a plurality of square blocks as shown in FIG. 4(c) (or FIG. 12(c)) and overlapped onto the image division result shown in FIG. 4(b) (or FIG. 12(b)). For the square blocks locating on division area borderlines, the division areas to which the blocks on the borderlines belong are determined by the area occupation factor thereof. In this way, the image division result shown in FIG. 4(b) (or FIG. 12(b)) is quantized as shown in FIG. 4(d) (or FIG. 12(d)).

$$\nabla^2 \times G(x, y) = \frac{1}{\pi\sigma^4}\left(1 - \frac{r^2}{2\sigma^2}\right)\exp\left(\frac{-r^2}{2\sigma^2}\right) \quad \text{(EQUATION 1)}$$

3. Generation of Peculiar Density Conversion Curve for each Quantized Area

Figure 5:
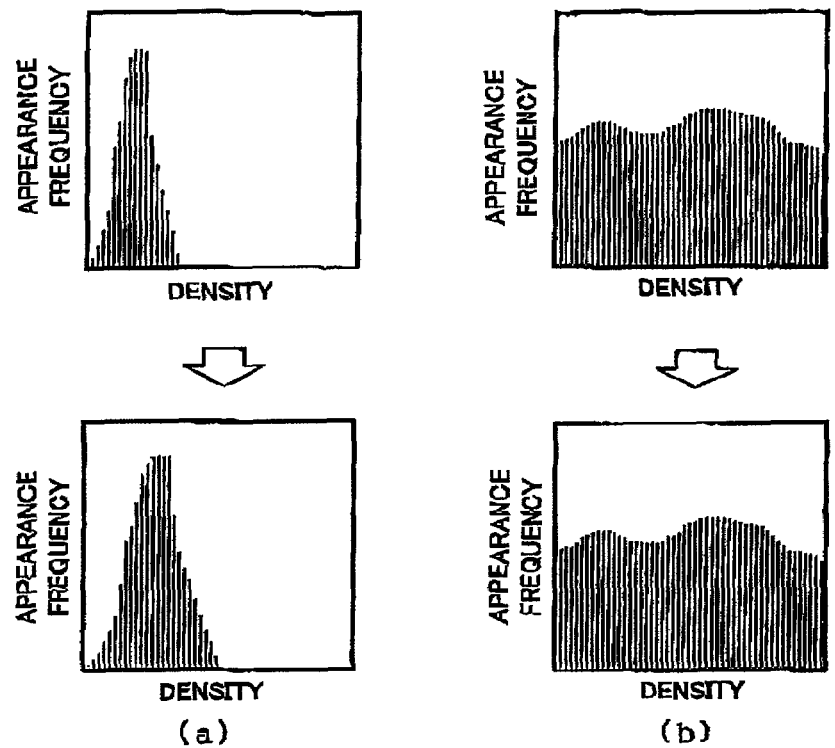
FIGS. 5(a) and 5(b) are views for describing a density histogram smoothing process.
Figure 6:
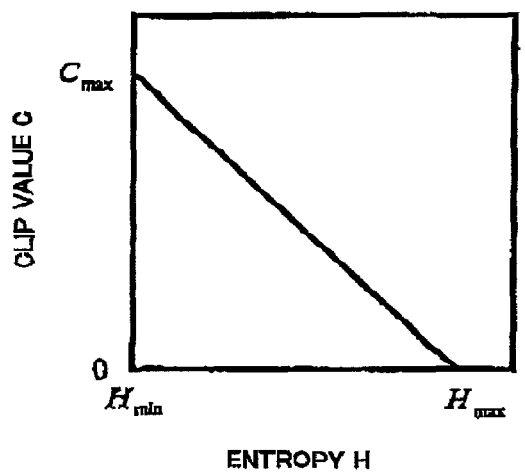
FIG. 6 is a graph representing the relation between entropy and clip value.

The density histogram generating means 10 generates density histograms specific to each quantized area (step S4). As for a division area having a wide fluctuation of density histogram's density value, i.e., having broad dynamic range, as shown in the upper graph in FIG. 5(b), detail data may not to be lost even when outputting data with a narrow dynamic range image output system. Thus, in this case no density histogram smoothing process is necessary. On the other hand, as for a division area of less density histogram density value fluctuations, i.e., narrow dynamic range, as shown in the upper graph in FIG. 5(a), detail data may be lost when the data is outputted with a narrow dynamic range image output system. For this reason, in this case it is necessary to broaden the dynamic range by smoothing the density histogram. A density value fluctuation of a density histogram is obtained for each division area, and a clip value which has influence on the density histogram smoothing degree is determined on the basis of the obtained fluctuation. In Embodiment 1, the entropy computing means 11 computes entropy H as a density value fluctuation of a density histogram by using Equation 2, and the clip value determining means 14 determines clip value C corresponding to the entropy H by referring to the LUT 13 (step S5). The LUT 13 stores the relation between the entropy and the clip value as determined on the basis of the graph shown in FIG. 6. The clipping means 15 clips the density histogram with a predetermined clip value, and the cumulative density histogram generating means 16 generates a cumulative density histogram from the clipped density histogram data (step S6).

$$H = \sum_{i=Imin}^{Imax} -p_i \log p_1 \quad \text{(EQUATION 2)}$$

Imax: maximum density value
Imin: minimum density value
Pi: appearance frequency of pixel having density i 4. Density Conversion The density conversion means 4 executes density conversion of each pixel in each division area by using a cumulative histogram specific to each area as density conversion curve (step S7) to execute the following step S8 (image output). However, lest discontinuity should be formed in the borderline between adjacent division areas, the following linear interpolation is executed for the pixels in the square blocks pertaining to the borderlines. (Refer to, for instance, Naoki Kobayashi et al, "Fast Local Contrast Emphasizing for Natural Image", The Institute of Electronics, Information and Communication Engineers, D-II, Vol. 1, J7-D-II, No. 3, pp. 502–509.)

Figure 7:
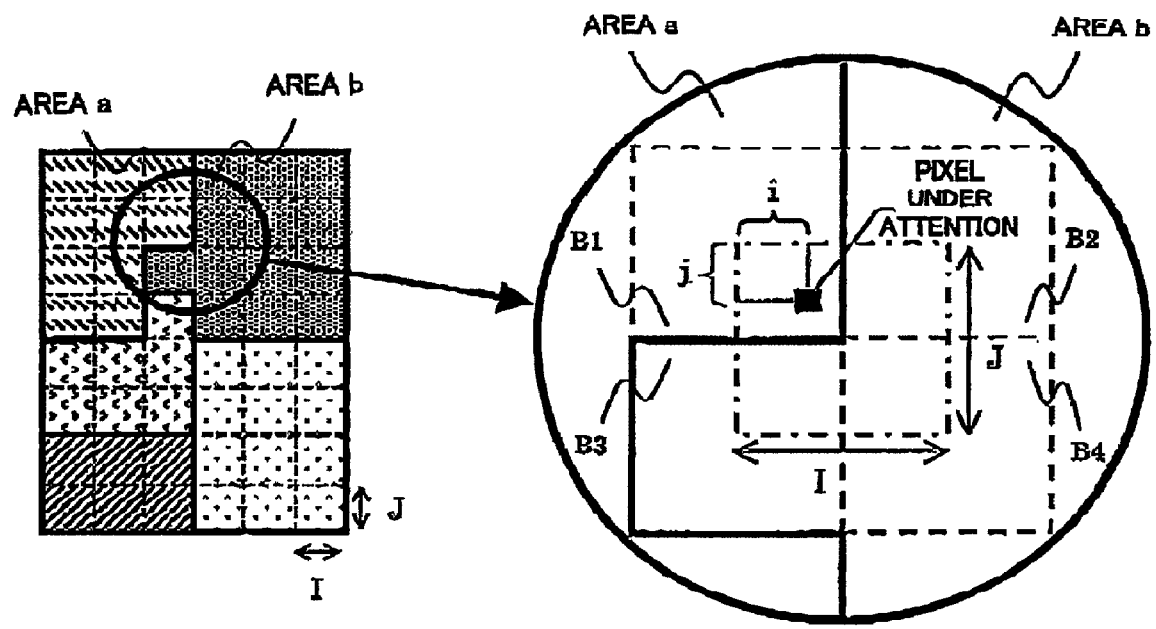
FIG. 7 is a view for describing a method of density interpolation in a density conversion means.
Figure 8:
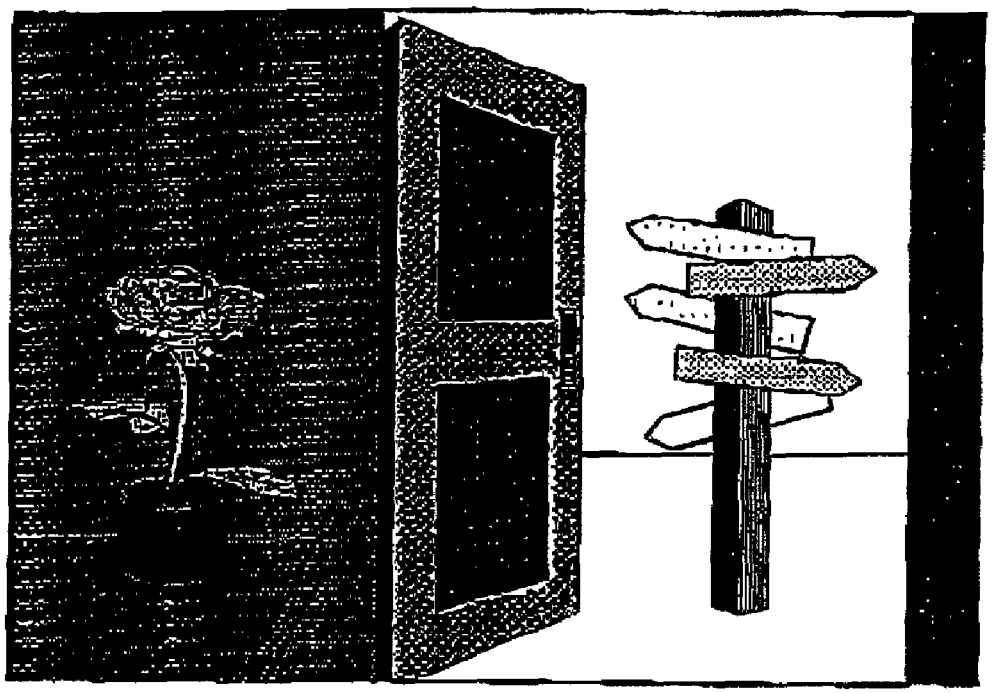
FIGS. 8(a) and 8(b) are views for describing a drawback in the prior art.
Figure 8:
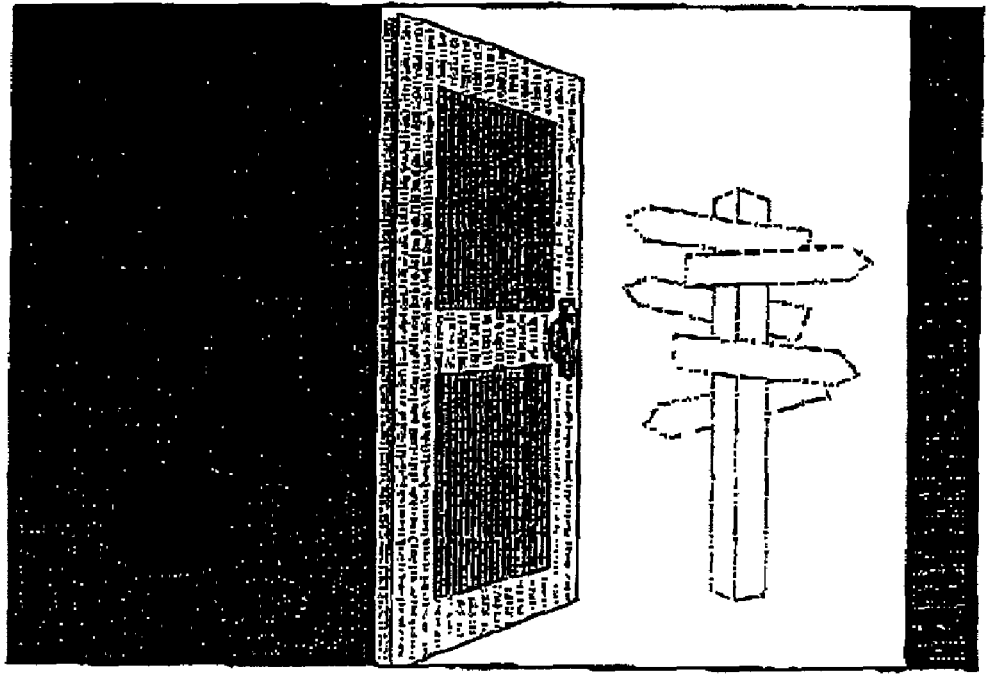

(1) As shown in FIG. 7, the density value of the pixel under attention is converted by using the density conversion curves of the block B1, to which that pixel belongs, and the density conversion curves of the neighboring three blocks B2 to B4, to obtain converted density values $g_1$ to $g_4$.

(2) Density values g (x, y) after linear interpolation are computed based on Equation 3. To compute g(x,y), the converted density values $g_1$ to $g_4$ obtained in (1) are weighted according to the distances to the centers of the four blocks B1 to B4 from the pixel under attention.)

$$g(x, y) = \frac{J-j}{J}\left(\frac{I-i}{I}g_1 + \frac{i}{I}g_2\right) + \frac{j}{J}\left(\frac{I-i}{I}g_3 + \frac{i}{I}g_4\right) \quad \text{(EQUATION 3)}$$

5. Image Outputting

The image obtained as the result of the density conversion process executed for less detail data loss in the above way is outputted from the electronic imaging device to the image output apparatus as shown in FIG. 1(b), which is connected to the electronic imaging device. The outputted image is subjected in a gamma compensating means 5, and a gamma compensation process is applied for compensating the characteristics of the device. The compensated image is then displayed on a monitor or outputted to a printer (an image output means 6).

The embodiment includes the following processes shown in FIGS. 3(b) and 3(c). Referring to FIG. 3(b), in a step S21 the input image (area) is divided based on frequency component data and the input image is divided into a plurality of small blocks (of a square grating) in step S22. Then, frequency component data of each small block is computed by Fourier transform or Wavelet transform (step S23) and small blocks are progressively unified on the basis of similarity measure of frequency component data of adjacent small blocks (step S24).

Referring to FIG. 3(c), in a step S31 the input image (area) is divided based on edge length and the input image is divided into a plurality of small blocks (of a square grating) (step S32). In a step S33, edge length of pixel under attention of each block is computed and the sum of the edge lengths of the pixels under attention in each small block are computed (step S 34). Then, in a step S35, the small blocks are progressively unified on the basis of the similarity measure of the edge length sums of adjacent small blocks.

A different embodiment of the electronic imaging device adopting the automatic visibility improvement method for digital image according to the present invention (hereinafter referred to as Embodiment 2) will now be described. This Embodiment 2 of the electronic imaging device basically has the same construction as the above Embodiment 1 of the electronic imaging device. As a difference, while in Embodiment 1 the method adopting the filtering process using the LOG filter for input image operation is used for dividing the input image into a plurality of division areas, in this embodiment a method adopting an edge length (long or short) judging process with respect to the input image is used to the same end. This point will be described hereinunder.

In Embodiment 2, the image dividing means 2 executes the image division as follows.

(1) The image dividing means 2 divides the input image into a plurality of small blocks like square grating. If the number of pixels in the small block is too small, the density histogram is meaningless. On the other hand, if the small block pixel number is too large, the resolution is decreased. In Embodiment 2, the number is determined empirically by taking the compromise between the two cases into considerations.

Figures 10, 11:
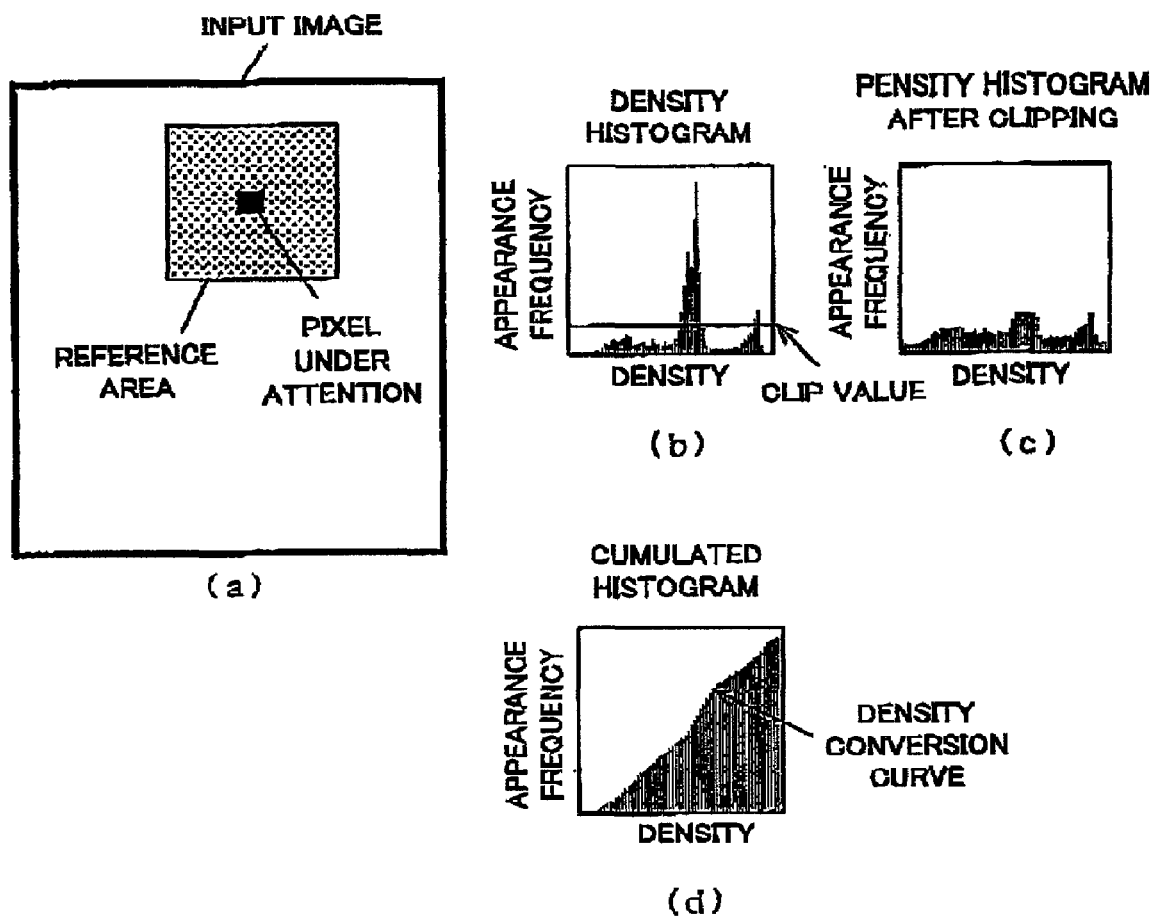
FIGS. 10(a) to 10(d) are views for describing AHE.
FIGS. 11(a) to 11(d) are views showing Sobel operators.

(2) Convolution operation of the 3×3 matrix constituted by the pixel under attention and the eight neighboring pixels and corresponding Sobel operators shown in FIGS. 11(*a*) to 11(*d*) is executed. Of the absolute values of the four values obtained by the operation, the maximum one is made to be the edge length of the pixel under attention.

(3) The sum of the edge lengths of the pixels in the block is computed.

(4) The difference between the edge length sums of adjacent blocks is computed, and when the difference is less than a predetermined threshold value, the adjacent blocks are unified. This method of image division is based on the concept that the edge length sums of adjacent blocks are substantially the same when the textures thereof are similar.

Figure 9:
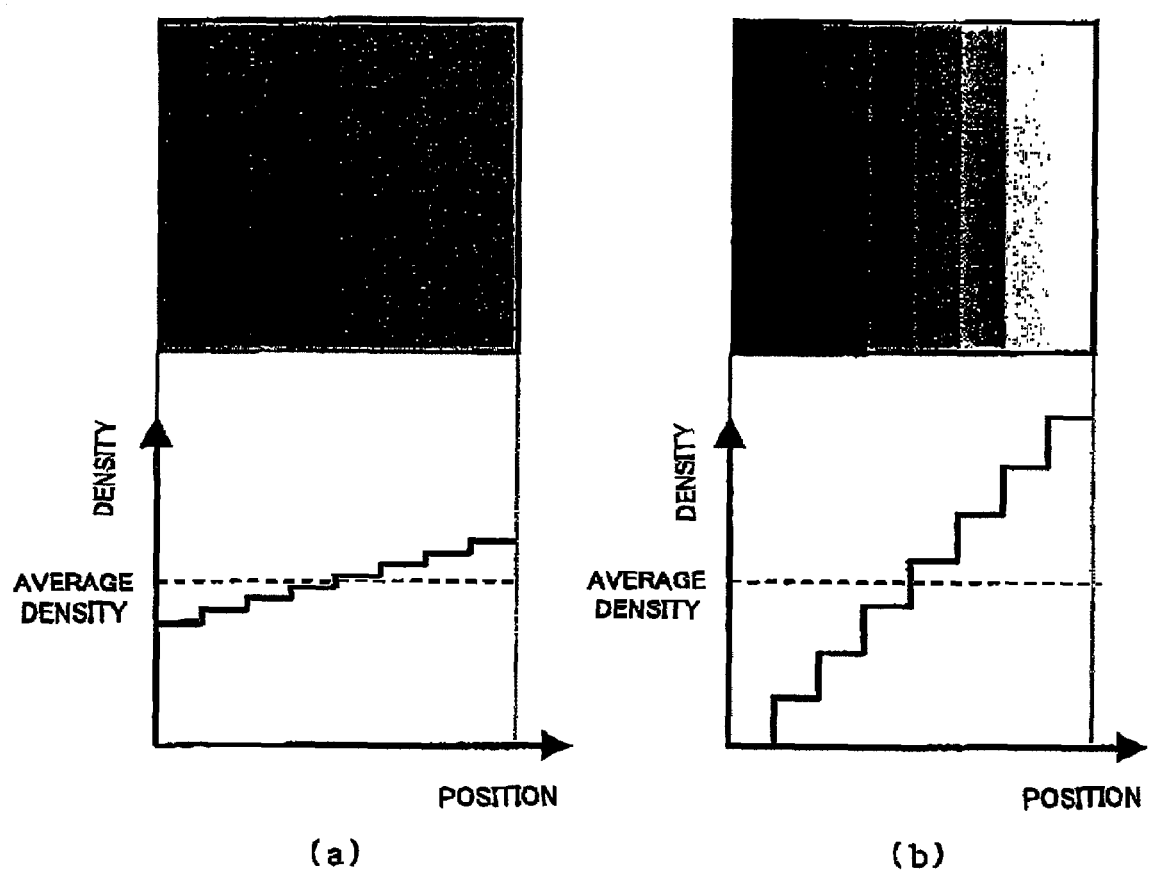
FIGS. 9(a) and 9(b) are views for describing a drawback in the prior art.

As has been described in the foregoing, in Embodiments 1 and 2 the input image division is executed by analyzing the input image texture in the method based on the filtering process using the LOG filter for input image operation, the method based on the process of analyzing frequency components of the input image or the method based on the process of edge length judgment with respect to the input image. Thus, the textures A and B shown in FIGS. 9(*a*) and 9(*b*) which have heretofore been considered to be the same, are regarded to be of different area. The density conversion thus can be made by using different conversion curves. In addition, the fluctuation manner of the density histogram is obtained for each division area, and the clip value which is influential on the degree of density histogram smoothing is determined on the basis of the obtained fluctuation manner. Thus, for division areas having broad dynamic ranges, no density histogram smoothing process is executed because detailed data may not be lost even by outputting data with a narrow dynamic range image output system, while as for narrow dynamic range division areas, the clip value is determined so that a process of broadening the dynamic range by smoothing the density histogram can be executed because without the broadning the dynamic range, detail data may be lost by outputting data with the narrow dynamic range data output system. Thus, it is possible to reduce loss of useful data compared to the prior art case.

Figure 3:
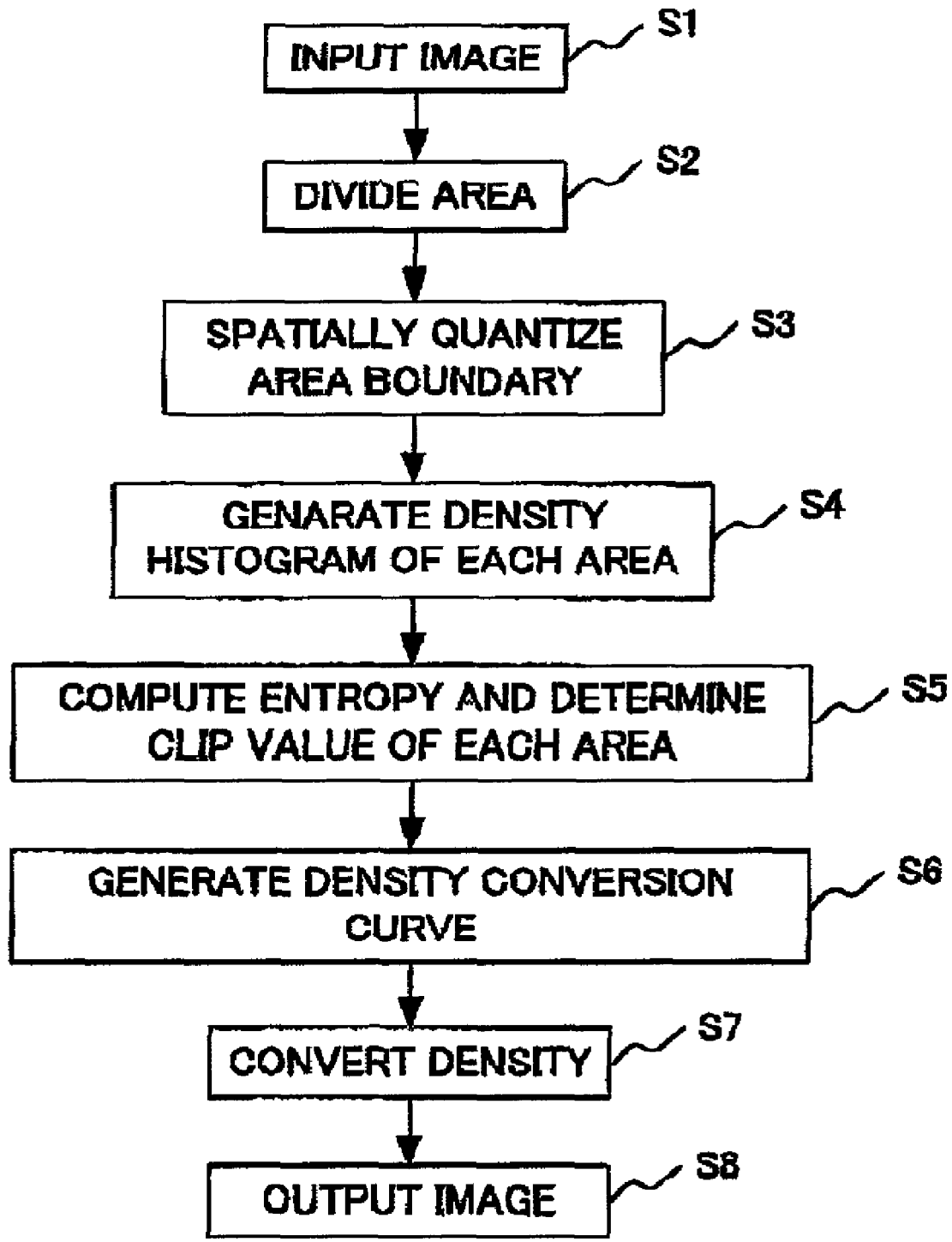
FIGS. 3(a) to 3(c) are flow charts showing the flow of visibility improvement.
Figure 3:
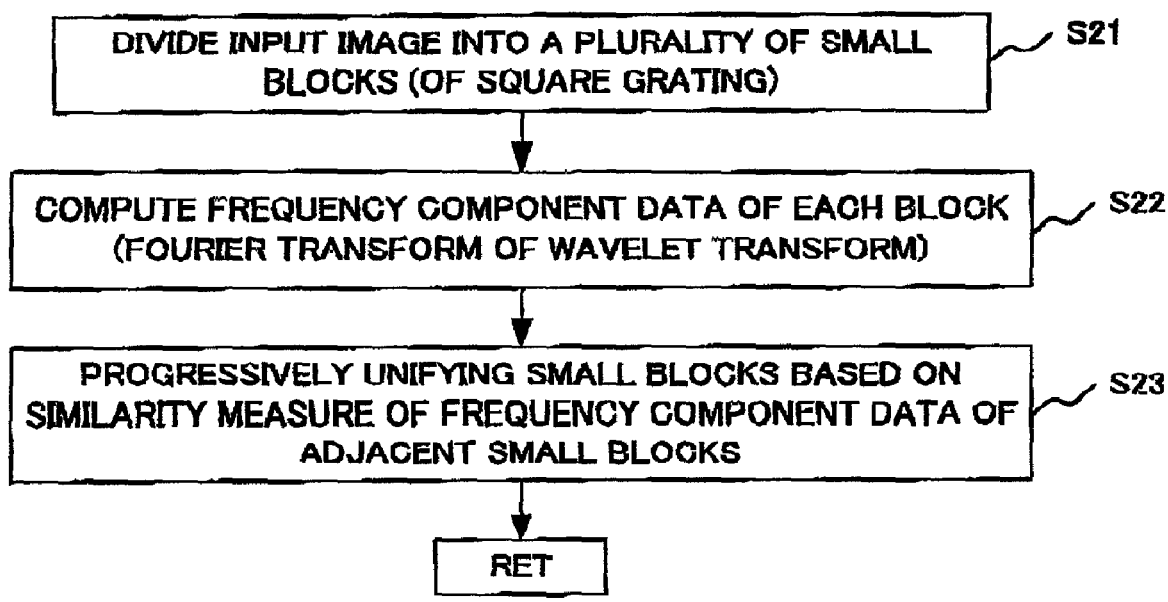
Figure 3:
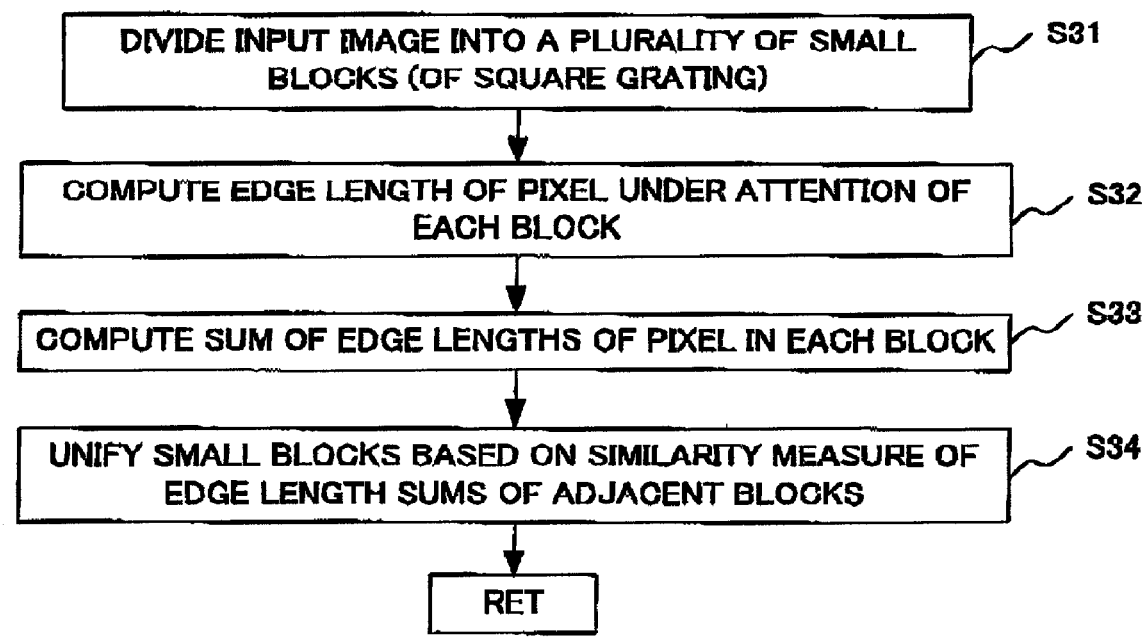

The foregoing image division processing will be summarized with reference to flow charts shown in FIGS. 3(*b*) and 3(*c*). Referring to FIG. 3(*b*), in a step S21 the input image (area) is divided based on frequency component data and the input image is divided into a plurality of small blocks (of a square grating) in step S22. Then, frequency component data of each small block is computed by Fourier transform or Wavelet transform (step S23) and small blocks are progressively unified on the basis of similarity measure of frequency component data of adjacent small blocks (step S24).

Referring to FIG. 3(*c*), in a step S31 the input image (area) is divided based on edge length and the input image is divided into a plurality of small blocks (of a square grating) (step S32). In a step S33, edge length of pixel under attention of each block is computed and the sum of the edge lengths of the pixels under attention in each small block are computed (step S 34). Then, in a step S35, the small blocks are progressively unified on the basis of the similarity measure of the edge length sums of adjacent small blocks.

Also, in Embodiment 2, the image division is executed by a process of computing the edge length sum of the pixels in each division area and progressively unifying blocks on the basis of the degree of similarity of the edge length sums of adjacent blocks. However, it is also possible to execute the image division by a process of computing frequency component data of each block by Fourier transform or Wavelet transform and progressively unifying blocks on the basis of the similarity measure of frequency component data of adjacent blocks.

Furthermore, in Embodiment 1 or 2, the manner of fluctuations of the density histogram is evaluated in terms of entropy. However, it is also possible to make the evaluation in terms of such parameters as the dispersion of the frequencies of which densities of the pixels appear in each division area and the edge length sum of the pixels in each division area.

According to the present invention, the input image is divided into a plurality of division areas on the basis of the texture analysis result, and preferably, the density histogram smoothing degree is determined for each division area on the basis of the broadness of the dynamic range. It is thus possible to reduce the loss of useful data compared to the prior art case.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An automatic visibility improvement method for digital image comprising steps of dividing an input image into a plurality of division areas and executing a density conversion process specific to each division area, wherein texture of the input image is analyzed, and the division areas are determined on the basis of the analysis result, and wherein the texture analysis is executed based on a process of analyzing frequency components of the input image, and includes a process of (1) dividing the input image into a plurality of small blocks like a square grating, (2) computing frequency component data of each small block by Fourier transform or Wavelet transform and (3) progressively unifying small blocks on the basis of similarity measure of frequency component data of adjacent small blocks.

2. The automatic visibility improvement method for digital image according to claim 1, wherein the density conversion process specific to each division area is executed for each division area and performs a process of (1) generating a density histogram, (2) computing the manner of fluctuations of the density histogram density value, (3) determining a clip value influential on the degree of smoothing of the density histogram, (4) clipping the density histogram to the clip value, (5) generating a cumulative density histogram from the clipped density histogram and (6) executing density conversion of each pixel in the division area with the cumulative histogram used as density conversion curve.

3. The automatic visibility improvement method for digital image according to claim 2, wherein the manner of density value fluctuations of the density histogram and the clip value are in a monotonously reducing relation to each other such that the clip value is reduced with increasing density value fluctuations of the density histogram.

4. The automatic visibility improvement method for digital image according to claim 3, wherein the manner of density value fluctuations of the density histogram is evaluated in terms of the average appearance frequencies of densities of the pixels in each division area.

5. An automatic visibility improvement method for digital image comprising steps of dividing an input image into a plurality of division areas and executing a density conversion process specific to each division area, wherein texture of the input image is analyzed, and the division areas are determined on the basis of the analysis result, and wherein the texture analysis is executed based on a process of edge length judgment with respect to the input image, and includes a process of (1) dividing the input image to a plurality of small blocks like a square grating, (2) computing the stun of the edge lengths of the pixels in each small block, and (3) progressively unifying the small blocks on the basis of the similarity measure of the edge length sums of adjacent small blocks.

6. The automatic visibility improvement method for digital image according to claim 5, wherein the density conversion process specific to each division area is executed for each division area and performs a process of (1) generating a density histogram, (2) computing the manner of fluctuations of the density histogram density value, (3) determining a clip value influential on the degree of smoothing of the density histogram, (4) clipping the density histogram to the clip value, (5) generating a cumulative density histogram from the clipped density histogram and (6) executing density conversion of each pixel in the division area with the cumulative histogram used as density conversion curve.

7. The automatic visibility improvement method for digital image according to claim 6, wherein the manner of density value fluctuations of the density histogram and the clip value are in a monotonously reducing relation to each other such that the clip value is reduced with increasing density value fluctuations of the density histogram.

8. The automatic visibility improvement method for digital image according to claim 7, wherein the manner of density value fluctuations of the density histogram is evaluated in terms of the average appearance frequencies of densities of the pixels in each division area.

9. An automatic visibility improvement method for digital image comprising steps of dividing an input image into a plurality of division areas and executing a density conversion process specific to each division area, wherein:

an adaptive histogram smoothing method as contrast emphasizing process in image processing is adopted for the input image; and a reference division area in the adaptive density histogram smoothing method is fully automatically determined by dividing an input image into a plurality of division areas and executing a density conversion process specific to each division area, wherein texture of the input image is analyzed, and the division areas are determined on the basis of the analysis result, while fully automatically determining a clip value in the local histogram smoothing method on the basis of the manner of fluctuations of the density histogram density value.

10. An automatic visibility improvement method for digital image comprising steps of dividing an input image into a plurality of division areas and executing a density conversion process specific to each division area, wherein texture of the input image is analyzed, and the division areas are determined on the basis of the analysis result, and wherein the density conversion process specific to each division area is executed for each division area and performs a process of (1) generating a density histogram, (2) computing the manner of fluctuations of the density histogram density value, (3) determining a clip value influential on the degree of smoothing of the density histogram, (4) clipping the density histogram to the clip value, (5) generating a cumulative density histogram from the clipped density histogram and (6) executing density conversion of each pixel in the division area with the cumulative histogram used as density conversion curve.

11. The automatic visibility improvement method for digital image according to claim 10, wherein the manner of density value fluctuations of the density histogram and the clip value are in a monotonously reducing relation to each other such that the clip value is reduced with increasing density value fluctuations of the density histogram.

12. The automatic visibility improvement method for digital image according to claim 11, wherein the manner of density value fluctuations of the density histogram is evaluated in terms of the average appearance frequencies of densities of the pixels in each division area.

13. The automatic visibility improvement method for digital image according to claim 10, wherein the texture analysis is executed based on division of the input image into a plurality of division areas of different textures by a filtering process using a LOG filter for input image operation.

14. The automatic visibility improvement method for digital image according to claim 13, wherein the manner of density value fluctuations of the density histogram and the clip value are in a monotonously reducing relation to each other such that the clip value is reduced with increasing density value fluctuations of the density histogram.

15. The automatic visibility improvement method for digital image according to claim 14, wherein the manner of density value fluctuations of the density histogram is evaluated in terms of the average appearance frequencies of densities of the pixels in each division area.

* * * * *